United States Patent
Park et al.

(10) Patent No.: US 12,431,593 B2
(45) Date of Patent: Sep. 30, 2025

(54) BATTERY MODULE, BATTERY PACK INCLUDING THE SAME AND METHOD OF MANUFACTURING BATTERY PACK

(71) Applicant: LG Energy Solution, LTD., Seoul (KR)

(72) Inventors: Won Kyoung Park, Daejeon (KR); Junyeob Seong, Daejeon (KR); Subin Park, Daejeon (KR)

(73) Assignee: LG Energy Solution, LTD., Seoul (KR)

( * ) Notice: Subject to any disclaimer, the term of this patent is extended or adjusted under 35 U.S.C. 154(b) by 590 days.

(21) Appl. No.: 17/770,279

(22) PCT Filed: Jul. 23, 2021

(86) PCT No.: PCT/KR2021/009591
§ 371 (c)(1),
(2) Date: Apr. 19, 2022

(87) PCT Pub. No.: WO2022/039399
PCT Pub. Date: Feb. 24, 2022

(65) Prior Publication Data
US 2022/0294084 A1    Sep. 15, 2022

(30) Foreign Application Priority Data
Aug. 21, 2020    (KR) .................. 10-2020-0105144

(51) Int. Cl.
*H01M 50/516*    (2021.01)
*H01M 10/625*    (2014.01)
(Continued)

(52) U.S. Cl.
CPC ....... *H01M 50/516* (2021.01); *H01M 10/625* (2015.04); *H01M 10/653* (2015.04);
(Continued)

(58) Field of Classification Search
CPC ............. H01M 50/516; H01M 10/625; H01M 10/653; H01M 50/204; H01M 50/249;
(Continued)

(56) References Cited

U.S. PATENT DOCUMENTS

2007/0207377 A1*    9/2007    Han ................... H01M 50/507
                                                        429/185
2013/0330595 A1    12/2013    Lee et al.
(Continued)

FOREIGN PATENT DOCUMENTS

CN    103460448    12/2013
CN    110178245    8/2019
(Continued)

*Primary Examiner* — Lisa S Park
(74) *Attorney, Agent, or Firm* — Bryan Cave Leighton Paisner LLP

(57) ABSTRACT

A battery module including a battery cell having an electrode lead protruding from an end part thereof, a cell tray on which a plurality of battery cells are mounted, and a busbar mounted on one end part of the cell tray positioned in a direction parallel to a protruding direction of the electrode lead and welded to the electrode lead. The busbar comprises a busbar plate, which is a portion welded to the electrode lead, and a busbar connection part that is formed by bending one end of the busbar plate in a direction perpendicular to a surface of the busbar plate.

14 Claims, 18 Drawing Sheets

(51) Int. Cl.
  *H01M 10/653* (2014.01)
  *H01M 50/204* (2021.01)
  *H01M 50/249* (2021.01)
  *H01M 50/507* (2021.01)

(52) U.S. Cl.
  CPC ....... *H01M 50/204* (2021.01); *H01M 50/249* (2021.01); *H01M 50/507* (2021.01); *H01M 2220/20* (2013.01)

(58) Field of Classification Search
  CPC .......... H01M 50/507; H01M 2220/20; H01M 50/211; H01M 50/503; H01M 50/502; H01M 50/20; H01M 50/24; Y02E 60/10
  See application file for complete search history.

(56) References Cited

U.S. PATENT DOCUMENTS

| | | | |
|---|---|---|---|
| 2014/0065467 A1 | 3/2014 | Choi et al. | |
| 2015/0303415 A1* | 10/2015 | Kayano | H01M 50/51 429/159 |
| 2016/0301117 A1* | 10/2016 | Tyler | H01M 10/0525 |
| 2017/0141366 A1 | 5/2017 | Inakawa et al. | |
| 2018/0301913 A1* | 10/2018 | Irish | H02J 7/00047 |
| 2019/0348727 A1* | 11/2019 | Yoon | H01M 50/50 |
| 2020/0067040 A1 | 2/2020 | Kim et al. | |
| 2021/0083241 A1 | 3/2021 | Shin et al. | |
| 2021/0083254 A1 | 3/2021 | You et al. | |

FOREIGN PATENT DOCUMENTS

| | | |
|---|---|---|
| CN | 111247665 | 6/2020 |
| EP | 3561902 | 10/2019 |
| EP | 3690987 | 8/2020 |
| JP | 2008192471 | 8/2008 |
| JP | 2013-197015 A | 9/2013 |
| JP | 2015-230892 A | 12/2015 |
| JP | 2020514980 | 5/2020 |
| JP | 2020-087721 A | 6/2020 |
| KR | 10-2013-0080023 A | 7/2013 |
| KR | 20140056835 | 5/2014 |
| KR | 10-2015-0104432 A | 9/2015 |
| KR | 10-2015-0137841 A | 12/2015 |
| KR | 10-2017-0019041 A | 2/2017 |
| KR | 10-1806993 B1 | 12/2017 |
| KR | 10-2018-0092061 A | 8/2018 |
| KR | 10-2018-0137293 A | 12/2018 |
| KR | 10-2019-0112467 A | 10/2019 |
| KR | 10-2020-0004187 A | 1/2020 |
| KR | 10-2020-0021609 A | 3/2020 |
| KR | 10-2091907 B1 | 3/2020 |
| KR | 10-2020-0086933 A | 7/2020 |
| KR | 10-2160276 B1 | 9/2020 |
| WO | 2015190018 | 12/2015 |
| WO | WO2018/230819 * | 12/2018 |
| WO | 2020145737 | 7/2020 |

* cited by examiner

BATTERY MODULE, BATTERY PACK INCLUDING THE SAME AND METHOD OF MANUFACTURING BATTERY PACK

CROSS-REFERENCE TO RELATED APPLICATIONS

This application is a US National Phase entry pursuant to 35 U.S.C. § 371 of International Application No. PCT/KR2021/009591, filed on Jul. 23, 2021, and claims priority to and claims the benefit of Korean Patent Application No. 10-2020-0105144 filed on Aug. 21, 2020 with the Korean Intellectual Property Office, the disclosures of which are incorporated herein by reference in their entirety.

FIELD

The present disclosure relates to a battery module, a battery pack including the same, and a method of manufacturing the battery pack, and more particularly to a battery module manufactured by a novel process, a battery pack including the same, and a method of manufacturing the battery pack.

BACKGROUND

With advances in technological development and increasing demand for a mobile device, demand for a secondary battery as an energy source is rapidly increasing. Accordingly, research is being carried out on batteries capable of meeting various demands.

A secondary battery has attracted considerable attention as an energy source for power-driven devices, such as an electric bicycle, an electric vehicle, and a hybrid electric vehicle, as well as an energy source for mobile devices, such as a mobile phone, a digital camera, and a laptop computer.

Small-sized mobile devices use one or several battery cells for each device, whereas middle or large-sized devices such as vehicles require high power and large capacity. Therefore, a middle or large-sized battery module having a plurality of battery cells electrically connected to one another is used in middle or large-sizes devices.

Since the middle or large-sized battery module is preferably produced to have as small a size and weight as possible, a prismatic battery, a pouch-shaped battery or the like, which can be stacked with high integrity and has a small weight relative to capacity, is mainly used as a battery cell of the middle or large-sized battery module. Meanwhile, to protect the battery cell stack from external impact, heat or vibration, the battery module may include a housing in which a front surface and back surface are opened to house the battery cell stack in an internal space.

A plurality of battery cells should be electrically connected in series to each other for the middle or large-sized battery pack to provide output and capacity required by a specific apparatus or device.

FIG. 1 illustrates a method of welding an electrode lead in the battery cell stack included in a conventional battery module.

As illustrated in FIG. 1, one or more electrode leads 12 and 13 bent onto a busbar 15 can be welded using a jig 30. This increase the cost because of the material of the busbar 15, which may also require plating. Further, since the space of the region P of FIG. 1 corresponding to the rear face space of the electrode leads 12 and 13 is insufficient, it is difficult to confirm whether the welding surface contact is performed, which makes it difficult to guarantee welding quality.

In this case, the quality of the bending process can affect the welding quality because the electrode leads 12 and 13 are bent after stacking the battery cells 11 to proceed with welding. It is difficult to reuse the battery cell 11 if a defect occurs during welding because the welding is performed after stacking the battery cells 11.

SUMMARY

An objective of the present disclosure is to provide a battery module manufactured by a new process that solves the problems of the existing welding process, a battery pack including the same and a method of manufacturing the battery pack.

However, the technical problem to be solved by embodiments of the present disclosure is not limited to the above-described problems, and can be variously expanded within the scope of the technical idea included in the present disclosure.

According to one exemplary embodiment of the present disclosure, there is provided a battery module comprising: a battery cell having an electrode lead protruding from one end part, a cell tray on which the battery cells are mounted, and a busbar mounted on one end part of the cell tray positioned in a direction parallel to the protruding direction of the electrode lead and welded to the electrode lead, wherein the busbar comprises a busbar plate, which is a portion of the busbar welded to the electrode lead, and a busbar connection part formed by being bent at one end of the busbar plate, and the busbar connection part is bent in a direction perpendicular to a surface of the busbar plate.

A welding surface of the busbar connection part may be formed along the width direction of the battery cell.

In the battery module, the electrode lead may be welded to the busbar plate in the same direction as the stacking direction of the battery cells.

The battery cell comprises at least one cell unit, wherein the at least one cell unit comprises a first battery cell and a second battery cell that are adjacent to each other, a cell tray comprising a first cell tray and a second cell tray on which the first battery cell and the second battery cell are mounted, respectively. A plurality of cell units are stacked to form a battery cell stack, and the plurality of cell units may be connected by a single cell unit connection member.

The cell unit connection member may connect a welding part of the busbar connection part formed in each of the plurality of cell units.

The battery module may further comprise a busbar connection member that connects a first busbar connection part mounted on the first cell tray and a second busbar connection part mounted on the second cell tray to each other.

The busbar connection member may be positioned between the cell unit connection member and the busbar connection part.

The cell units adjacent to each other may be connected to each other by an adhesive member.

The battery module may further comprise a fixing member formed at one end part of each of the first cell tray and the second cell tray in a width direction.

According to another exemplary embodiment of the present disclosure, there is provided a battery pack comprising: the above-mentioned battery module, a housing (pack frame) for the battery module, and a thermal conductive resin layer that is disposed between the battery module and the bottom part of the housing.

According to yet another exemplary embodiment of the present disclosure, there is provided a method of manufacturing a battery pack, the method comprising the steps of: mounting each of the plurality of battery cells on a cell tray, welding an electrode lead protruding from the battery cell to a busbar mounted on the cell tray, connecting adjacent battery cells by an adhesive member to form one cell unit including at least two battery cells, applying a thermal conductive resin to a lower housing portion having a plurality of module regions to form a thermal conductive resin layer, sequentially inserting the cell units on the thermal conductive resin layer to form a battery cell stack, and connecting busbars mounted on each of the cell trays included in the battery cell stack.

In the step of welding an electrode lead protruding from the battery cell to a busbar mounted on the cell tray, the electrode lead and the busbar may be welded in the same direction as the stacking direction of the battery cells in a state in which the busbars are arranged along a direction parallel to the protruding direction of the electrode lead.

In the step of connecting busbars mounted on each of the cell trays included in the battery cell stack, a welding surface of the busbar connection part included in the busbar may be connected by a single cell unit connection member.

The busbar connection part may be formed by bending one end part of a busbar plate of the busbar that is welded to the electrode lead, and a welding surface of the busbar connection part may be formed toward a width direction of the battery cell.

The step of connecting busbars mounted on each of the cell trays included in the battery cell stack further comprises forming a busbar connection member that connects the busbar connection parts formed in each of adjacent battery cells to each other, wherein the busbar connection member may be formed between the cell unit connection member and the busbar connection part.

The method of manufacturing a battery pack may further comprise forming an upper housing portion for covering the battery cell stack.

According to exemplary embodiments of the present disclosure, only the corresponding battery cells are discarded at the time of occurrence of defect because the battery cells are unit-welded to the cell tray, thereby preventing the entire cell stack from being discarded.

In addition, since the electrode leads are welded without bending, the welding quality can be improved.

Further, the battery cells can be connected via a connection member in a pack unit without using a busbar frame, thereby simplifying the production process.

The effects of the present disclosure are not limited to the effects mentioned above and additional other effects not described above will be clearly understood from the description of the appended claims by those skilled in the art.

DETAILED DESCRIPTION

Figure 1:
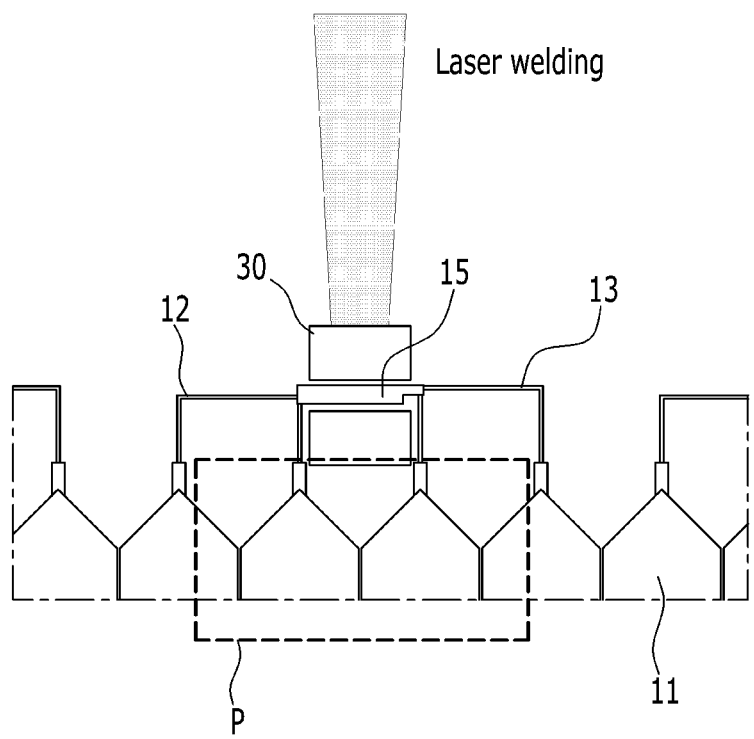
FIG. 1 illustrates a method of welding an electrode lead in the battery cell stack included in a conventional battery module.

Hereinafter, various embodiments of the present disclosure will be described in detail with reference to the accompanying drawings so that those skilled in the art can easily carry out them. The present disclosure can be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of the description, and the present disclosure is not necessarily limited to those illustrated in the drawings. In the drawings, the thickness of layers, regions, etc. are exaggerated for clarity. In the drawings, for convenience of the description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Figure 2:
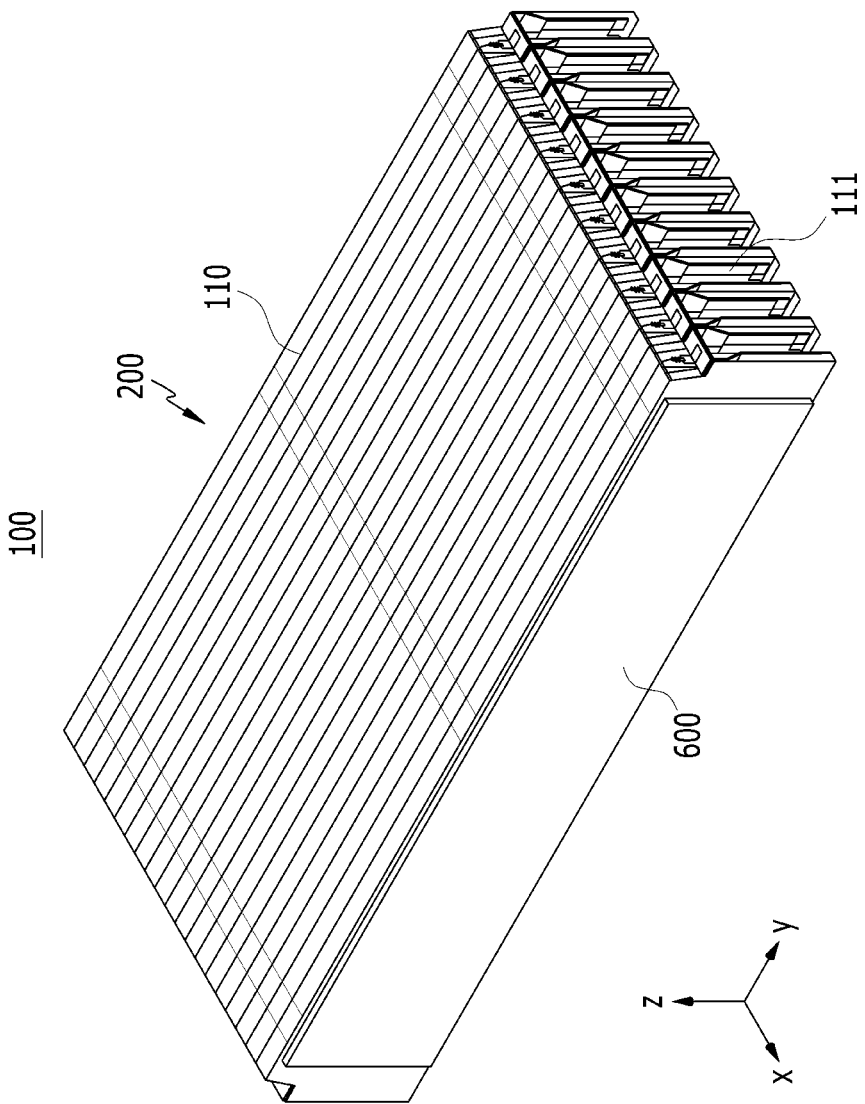
FIG. 2 is a perspective view of a battery module according to one exemplary embodiment of the present disclosure.
Figure 3:
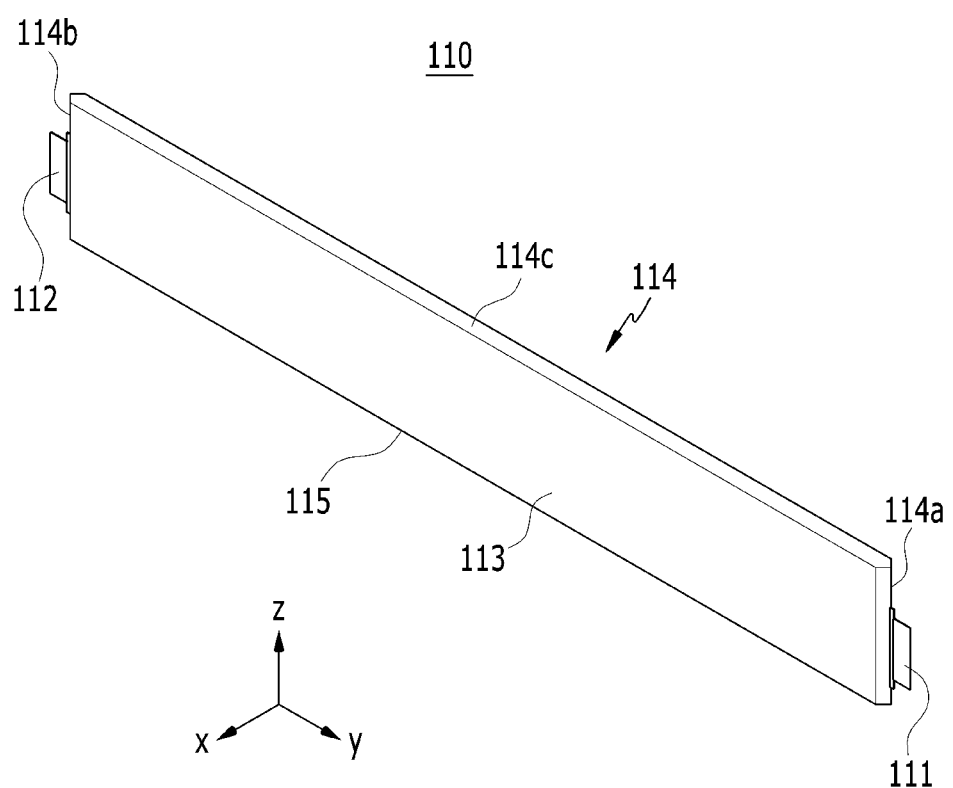
FIG. 3 is a perspective view of a battery cell included in the battery module of FIG. 2.

FIG. 2 is a perspective view of a battery module according to one exemplary embodiment of the present disclosure. FIG. 3 is a perspective view of a battery cell included in the battery module of FIG. 2.

As illustrated in FIGS. 2 and 3, a battery module 100 according to one exemplary embodiment of the present disclosure includes a battery cell stack 200 in which a plurality of battery cells 110 are stacked.

The battery cell 110 is preferably a pouch-type battery cell, and may be formed into a rectangular sheet-like structure. For example, the battery cell 110 according to the present embodiment has two electrode leads 111 and 112 protruding from one end part 114a and the other end part 114b, respectively, which are disposed on the opposite sides to each other in reference to the cell body 113. More specifically, the electrode leads 111 and 112 are connected to an electrode assembly (not shown) and protrude from the electrode assembly (not shown) to the outside of the battery cell 110. One of the two electrode leads 111 and 112 may be a positive electrode lead 111 and the other may be a negative electrode lead 112. That is, the positive electrode lead 111 and the negative electrode lead 112 can protrude in opposite directions to each other in reference to one battery cell 110.

The battery cell 110 can be produced by joining both end parts 114a and 114b of a cell case 114 and one side part 114c connecting them in a state in which an electrode assembly (not shown) is housed in a cell case 114. That is, the battery cell 110 according to the present embodiment has a total of three sealing parts, the sealing part has a structure in which it is sealed by a method such as heat fusion, and the remaining other side part may be composed of a connection part 115. The cell case 114 may be composed of a laminate sheet including a resin layer and a metal layer.

A plurality of such battery cells 110 may be formed, and the plurality of battery cells 110 are stacked so that they are electrically connected to each other, thereby forming a battery cell stack 200. As illustrated in FIG. 3, the plurality of battery cells 110 may be stacked along the x-axis direction. Thereby, the electrode leads 111 and 112 can protrude in the y-axis direction and the –y-axis direction, respectively.

The battery module 100 according to the present embodiment forms a module-less structure in which the housing and the end plate are removed. The battery module 100 according to the present embodiment may include a side surface plate 600 and a holding band (not shown) instead of the housing. As the housing and the end plate are removed, complicated processes that require precise control, as in the process of housing the battery cell stack 200 inside the housing, or the process of assembling housings and end plates, is not necessary. Further, there is an advantage in that the weight of the battery module 100 can be significantly reduced by removing the housing and end plate. Further, the battery module 100 according to the present embodiment has an advantage in that re-workability is favorable in the battery pack assembly process due to the removal of the housing. In contrast, the conventional battery module 10 could not be reworked even if a defect occurs due to the welding structure of the housing.

The side surface plate 600 is a plate-shaped member and can be disposed on both side surfaces of the battery cell stack 200 to supplement the rigidity of the battery module 100. Such a side surface plate 600 has elastic properties and may include a plastic material manufactured by injection molding, and in some cases, a leaf spring material can be applied.

The holding band is a member that wraps the battery cell stack 200 at both end parts of the battery cell stack 200, and can fix the plurality of battery cells 110 and the side surface plates 600 constituting the battery cell stack 200. After the battery cell stack 200 and the side surface plate 600 are fixed via the holding band, an insulating cover (not shown) can be formed on the front surface and the back surface of the battery cell stack 200 corresponding to the direction in which the electrode leads 111 and 112 protrude. The battery cells 110 and the side surface plate 600 included in the battery cell stack 200 are fixed via the holding band, whereby the insulating cover can be easily coupled to the front surface and the back surface of the battery cell stack 200. Such a holding band can be composed of a material having a predetermined elastic force, and specifically, a structure of a leaf spring can be applied.

According to the present embodiment, the electrode leads 111 and 112 and the busbar 500 can be welded in the plane direction. The busbar 500 may include a busbar plate 510 and a busbar connection part 520. The electrode leads 111 and 112 can be welded to the busbar plate 510, which will be described later.

Figure 4:
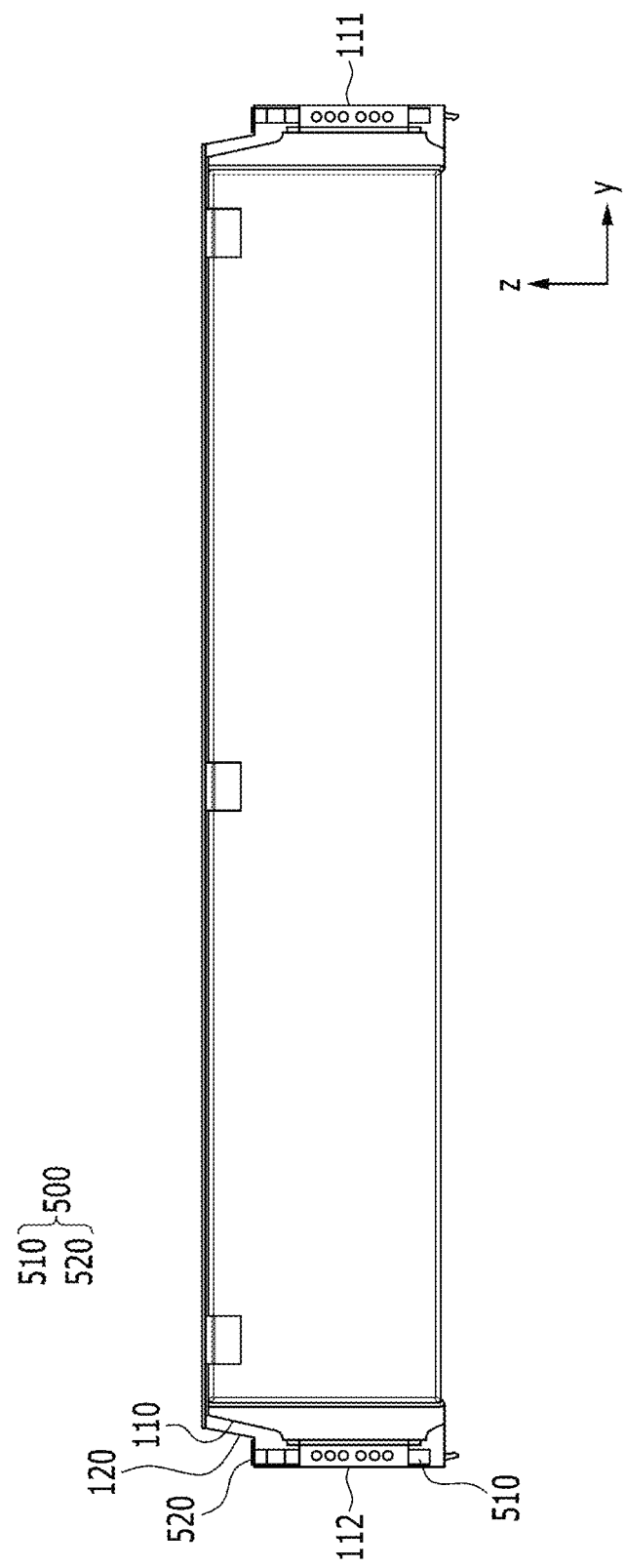
FIG. 4 is a side view of the battery cell of FIG. 3 when mounted on a cell tray.
Figure 5:
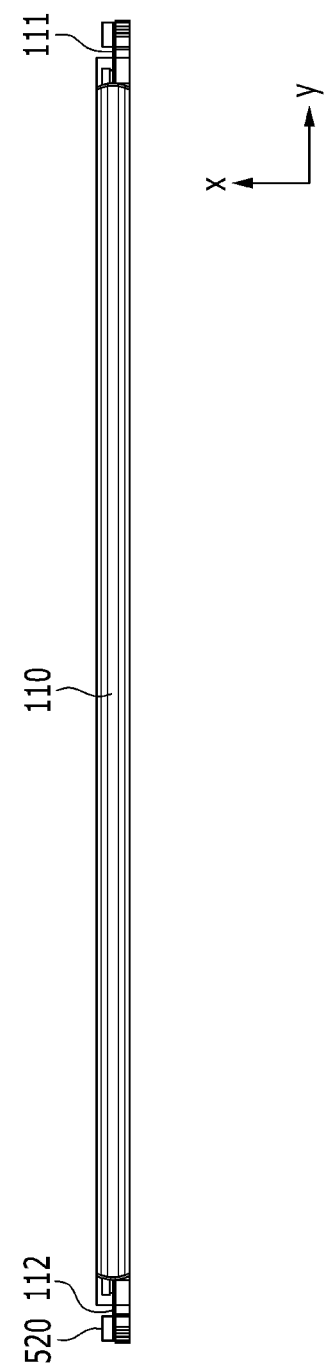
FIG. 5 is an illustration of the battery cell of FIG. 4 when viewed along the z-axis direction.

FIG. 4 is a side view of the battery cell of FIG. 3 mounted on a cell tray. FIG. 5 is a view of the battery cell of FIG. 4 when viewed along the z-axis direction.

As illustrated in FIGS. 4 and 5, the battery cells 110 included in the battery module according to the present embodiment are mounted on the cell tray 120. A busbar 500 is mounted at one end part of the cell tray 120 positioned in a direction parallel to the protruding direction of the electrode leads 111 and 112. The busbar 500 is welded to the electrode leads 111 and 112. The electrode leads 111 and 112 can be welded to the busbar 500 in the plane direction in a state in which they are not bent on the basis of the direction protruding from the main body of the battery cell 110.

The busbar 500 according to the present embodiment may include a busbar plate 510, and a busbar connection part 520 formed by being bent at one end of the busbar plate 510. The busbar connection part 520 is bent in a direction perpendicular to the surface of the busbar plate 510, and a welding surface of the busbar connection part 520 can be formed toward the width direction of the battery cell 110. At this time, the width direction of the battery cells 110 may be a z-axis direction perpendicular to the stacking direction of the battery cells 110 as shown in FIGS. 2 and 4. Additionally, the longitudinal direction of the battery cell 110 may be a y-axis direction which is the protrusion direction of the electrode leads 111 and 112.

Figure 6:
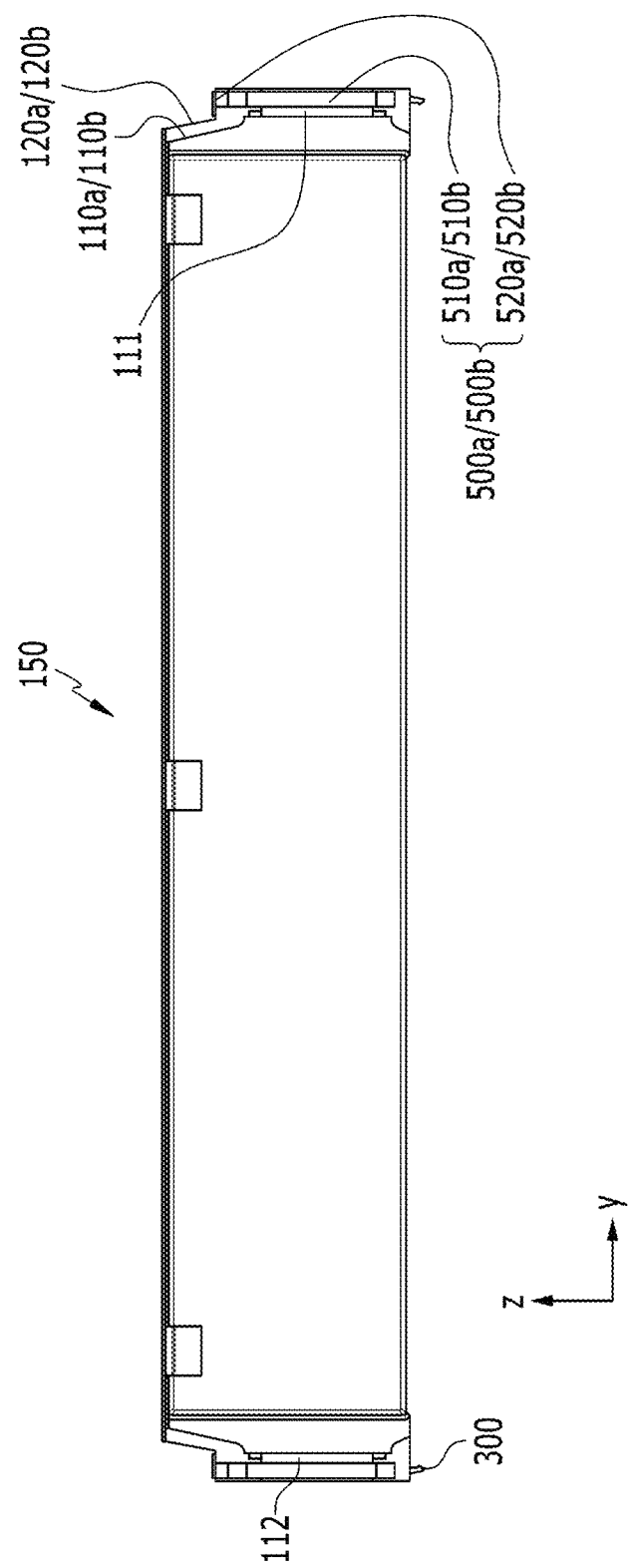
FIG. 6 is a side view of battery cells adjacent to each other when mounted on each cell tray and then coupled to form a cell unit.
Figure 7:
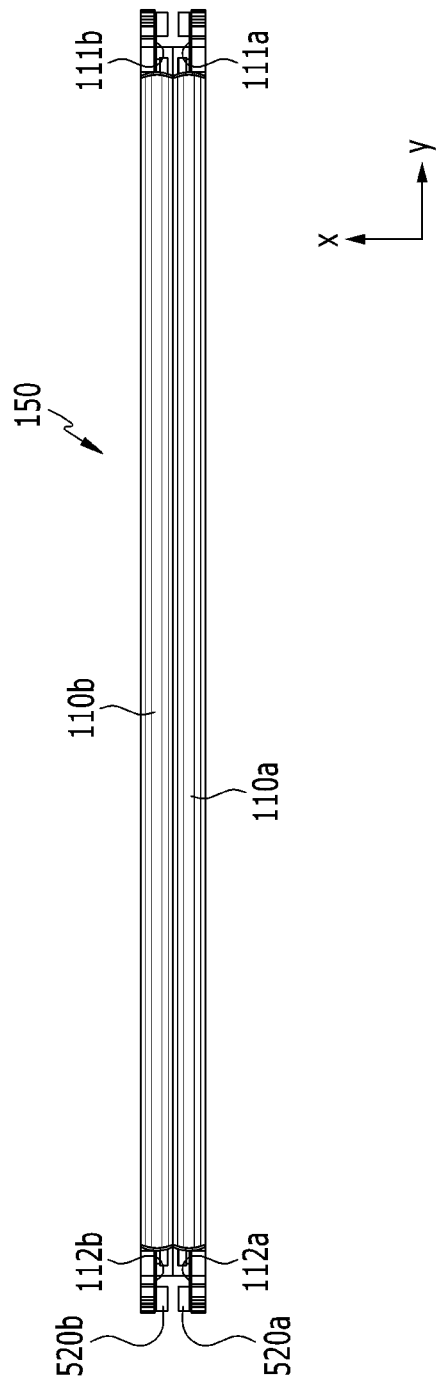
FIG. 7 is an illustration of the cell unit of FIG. 6 when viewed along the z-axis direction.

FIG. 6 is a side view of battery cells adjacent to each other that are mounted on each cell tray and then coupled to form a cell unit. FIG. 7 is a view of the cell unit of FIG. 6 when viewed along the z-axis direction.

As illustrated in FIGS. 6 and 7, the battery cell 110 according to the present embodiment includes a first battery cell 110a and a second battery cell 110b that are adjacent to each other, and the cell tray 120 may include a first cell tray 120a and a second cell tray 120b on which the first battery cells 110a and the second battery cells 110b are mounted, respectively. One cell unit 150 including the first battery cell 110a mounted in the first cell tray 120a and the second battery cell 110b mounted in the second cell tray 120b can be formed. The first battery cell 110a and the second battery cell 110b adjacent to each other can be connected to each other by an adhesive member.

In the cell unit 150, the first busbar 500a may include a first busbar plate 510a and a first busbar connection part 520a, and the second busbar 500b may include a second busbar plate 510b and a second busbar connection part 520b. At this time, the first busbar connection part 520a and the second busbar connection part 520b can be bent respectively from the first busbar plate 510a and the second busbar plate 510b to face each other.

One of the first electrode leads 111a and 112a protruding from both end parts of the first battery cell 110a may be a positive electrode lead, and the other one may be a negative electrode lead. Similarly, one of the second electrode leads 111b and 112b protruding from both end parts of the second battery cell 110b may be a positive electrode lead, and the other one may be a negative electrode lead. In one cell unit 150, the first electrode leads 111a and 112a and the second electrode leads 111b and 112b overlap each other, and the first electrode leads and the second electrode lead overlapping each other can have different polarities from each other. That is, at one end part of the cell unit 150, the first electrode lead 111a and the second electrode lead 111b having different polarities from each other may overlap, and at the other end part of the cell unit 150, the first electrode lead 112a and the second electrode lead 112b having different polarities from each other may overlap.

The battery module according to the present embodiment may further include a fixing member 300 formed at one end part of each of the first cell tray 120a and the second cell tray 120b in the width direction. The fixing member 300 may fix the cell unit 150 in the housing in a method of manufacturing a battery pack described later. Specifically, the fixing member 300 may allow the cell unit 150 to be fixed in the housing until a thermal conductive resin described later is cured. As an example, the fixing member 300 may have a hook structure.

Figure 8:
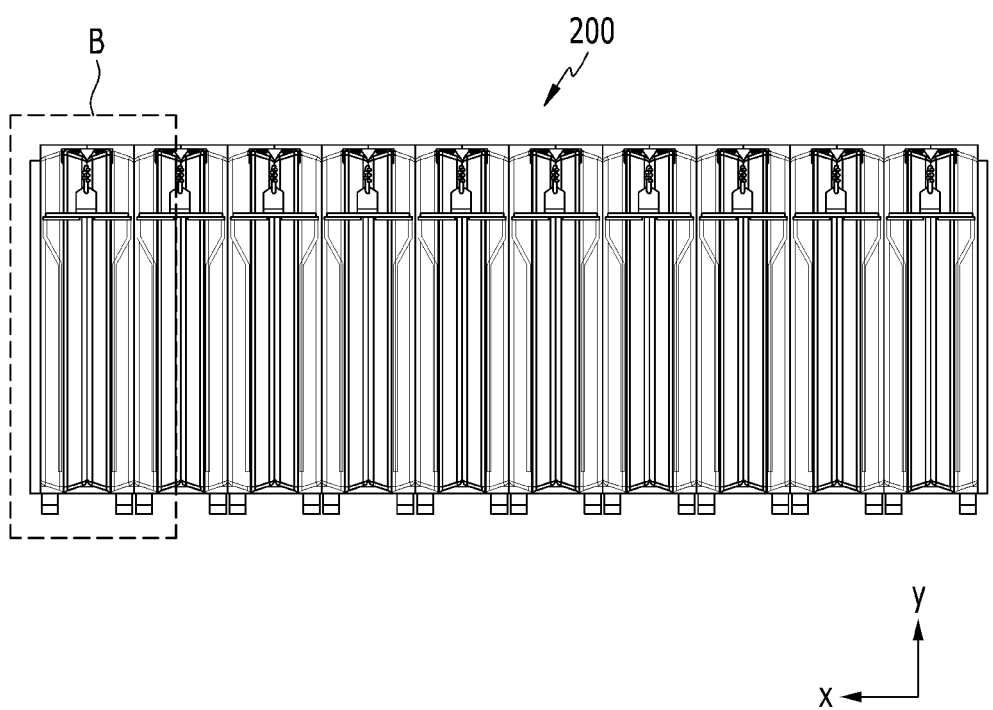
FIG. 8 is a front view of a battery cell stack formed by stacking a plurality of cell units of FIG. 6.
Figure 9:
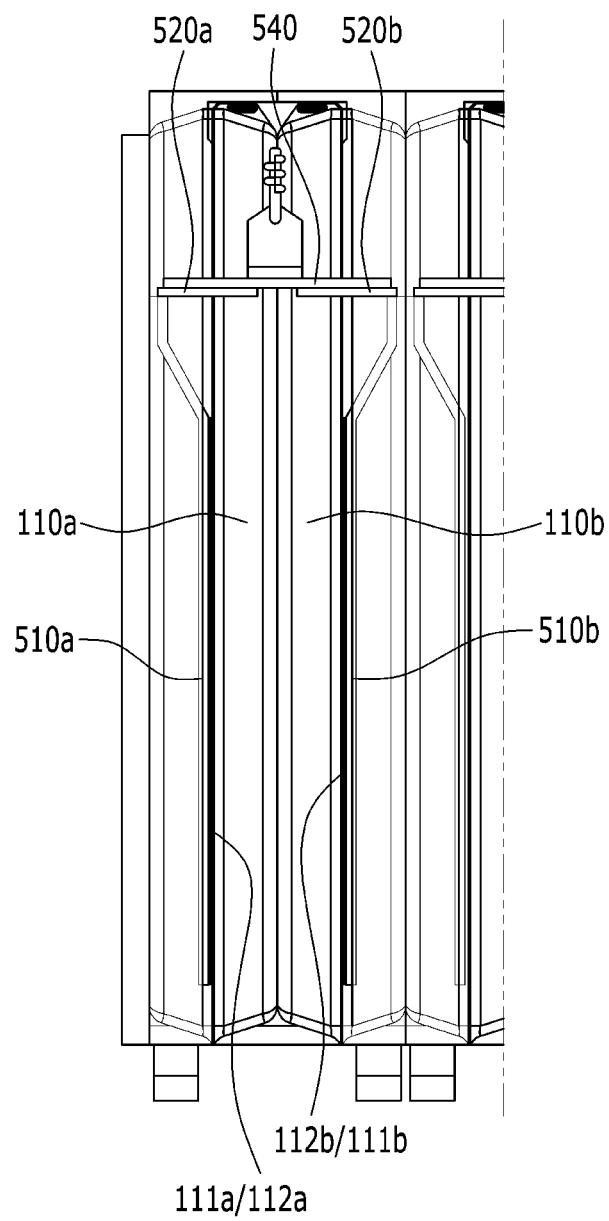
FIG. 9 is an enlarged view of one cell unit included in the battery cell stack of FIG. 8.
Figure 10:
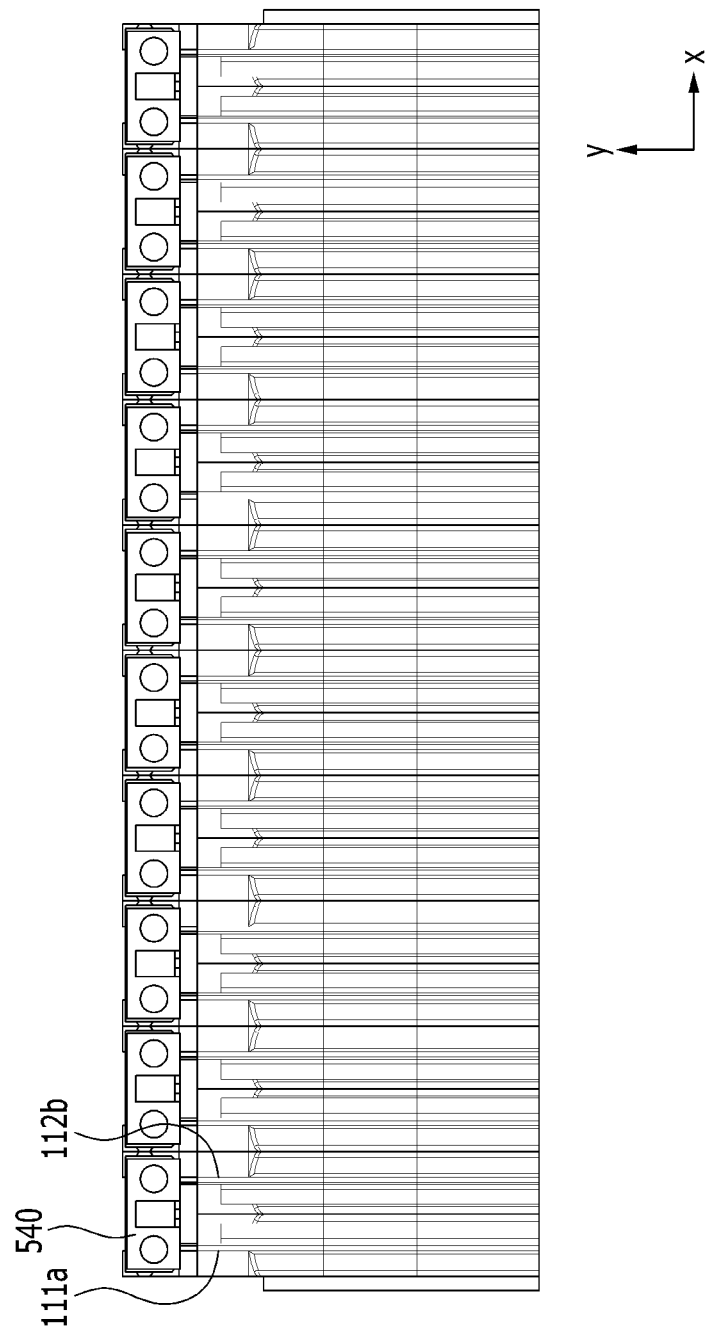
FIG. 10 is a plan view of the battery cell stack of FIG. 8.
Figure 11:
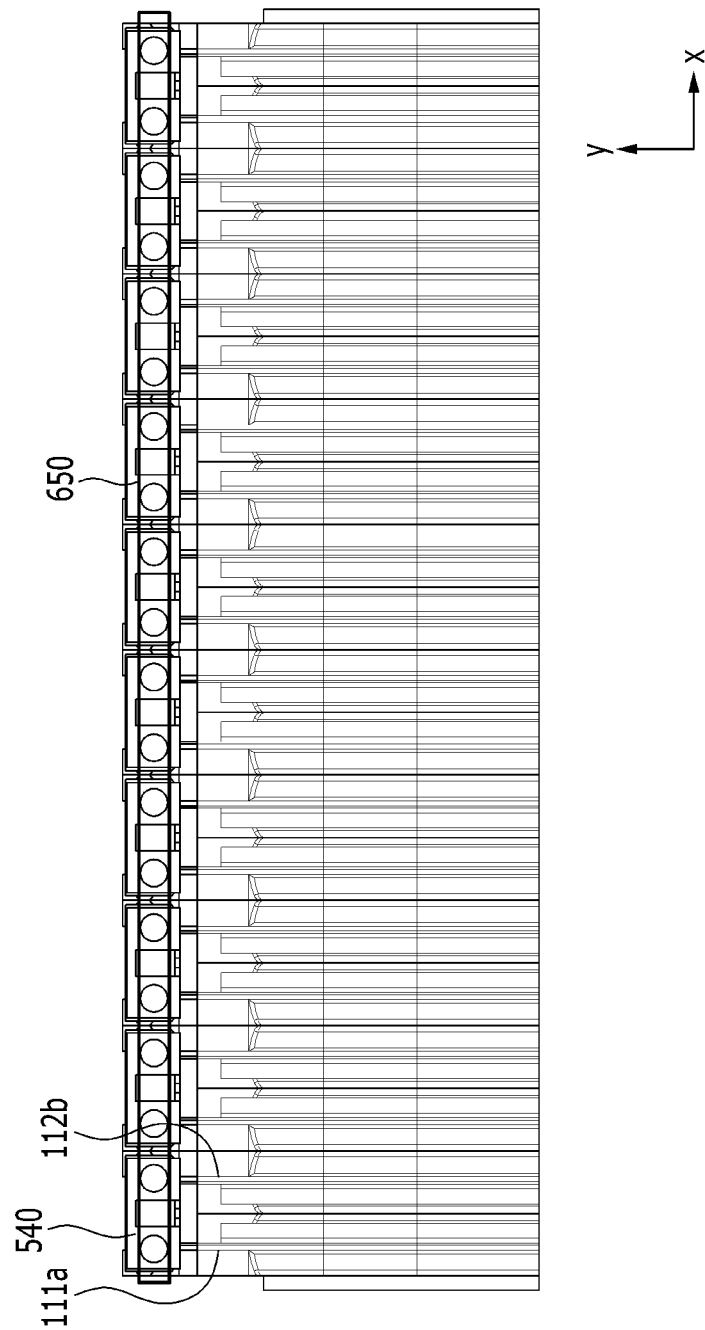
FIG. 11 is a plan view of a cell unit connection member formed in the battery cell stack of FIG. 10.

FIG. 8 is a front view of a battery cell stack formed by stacking a plurality of cell units of FIG. 6. FIG. 9 is an enlarged view of one cell unit included in the battery cell stack of FIG. 8. FIG. 10 is a plan view of the battery cell stack of FIG. 8. FIG. 11 is a plan view of a cell unit connection member formed in the battery cell stack of FIG. 10.

As illustrated in FIGS. 8 and 9, a plurality of cell units 150 of FIG. 6 can be stacked to form a battery cell stack 200. The first busbar plate 510a and the second busbar plate 510b included in the cell unit 150 can each have one end part that is inclined. By having such an inclined structure, the first busbar connection part 520a and the second busbar connection part 520b can be bent from one end part of each of the first busbar plate 510a and the second busbar plate 510b, respectively, to face each other. In other words, when the busbar plates 510a and 510b mounted on the cell trays 120a and 120b of FIG. 6 are coupled to the electrode leads 111a and 112b, respectively, a space for bending the first and second busbar plates 510a and 510b can be secured, and the space efficiency can be improved.

The battery module according to the present embodiment may further include a busbar connection member 540 that connects the first busbar connection part 520a and the second busbar connection part 520b. The busbar connection member 540 can electrically connect the electrode leads 111a and 112b formed in each of the battery cells 110a and 110b adjacent to each other. The busbar connection member 540 may connect the electrode leads 111a and 112b having different polarities.

According to the present embodiment, the welding quality is improved by welding the electrode leads without bending, and if a defect occurs during welding, only the corresponding battery cell may be discarded. Therefore, it is possible to prevent reusable battery cells from the battery cell stack welded after stacking must from being discarded.

As illustrated in FIGS. 9 and 10, the busbar connection parts 520a and 520b are bent in a direction perpendicular to the surfaces of the busbar plates 510a and 510b, respectively, and a welding surface of the busbar connection parts 520a and 520b can be formed in the width direction of the battery cells 110a and 110b, respectively. A busbar connection member 540 may be formed on the welding surface.

As illustrated in FIG. 11, the cell unit connection member 650 may be positioned on the busbar connection member 540. The cell unit connection member 650 can electrically connect the plurality of battery cells 110 included in the battery cell stack 200 of FIG. 8. According to the present embodiment, a plurality of cell units may be connected by a single cell unit connection member 650. As illustrated in FIGS. 9 and 11, the busbar connection member 540 according to the present embodiment may be positioned between the cell unit connection member 650 and the busbar connection parts 520a and 520b. In another exemplary embodiment, the busbar connection member 540 may be omitted and the cell unit connection member 650 may be welded directly to the busbar connection parts 520a and 520b.

FIGS. 12 to 18 illustrate a method of manufacturing a battery pack according to another exemplary embodiment of the present disclosure.

Figure 12:
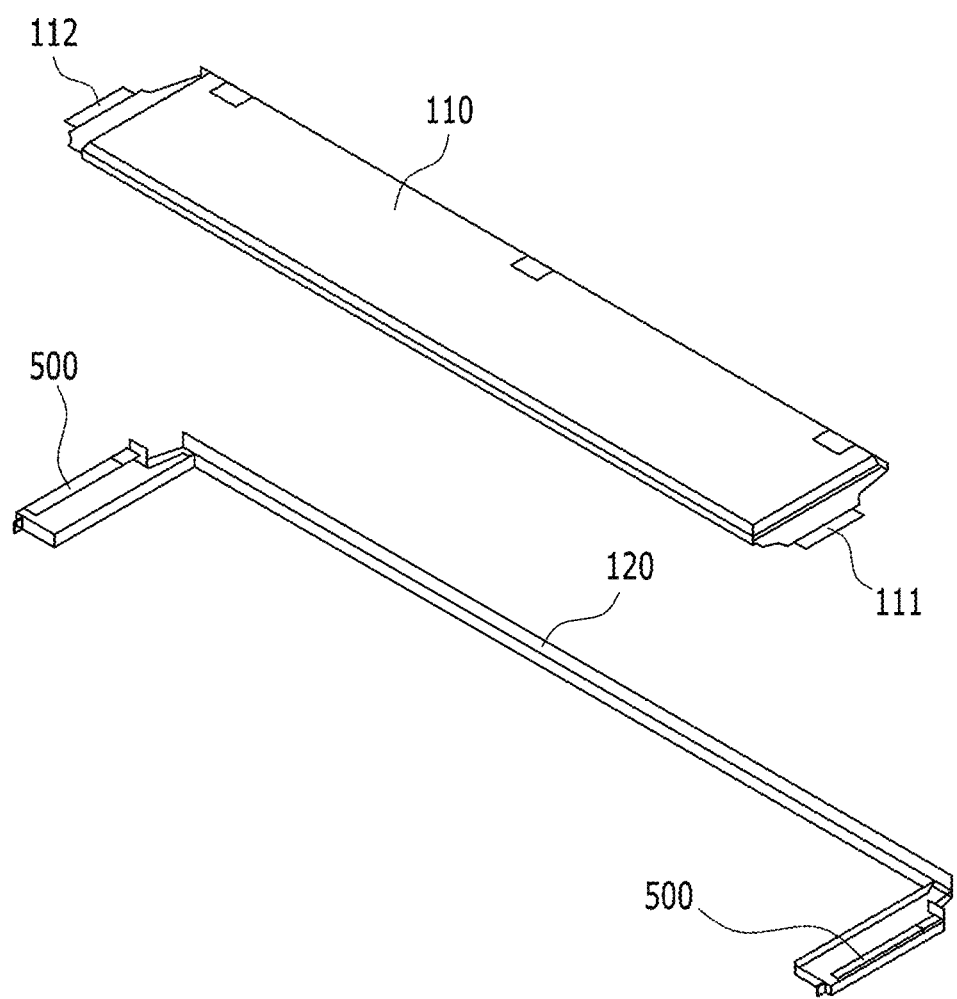
FIGS. 12 to 18 illustrate a method of manufacturing a battery pack according to another exemplary embodiment of the present disclosure.

As illustrated in FIG. 12, the method of manufacturing a battery pack according to the present embodiment includes a step of mounting each of a plurality of battery cells 110 on a cell tray 120. The cell tray 120 may surround (wrap around) three corners of the battery cells 110, and a busbar 500 can be mounted to the cell tray 120 at the portion corresponding to the electrode leads 111 and 112 of the battery cells 110. As illustrated in FIG. 4, the busbar 500 mounted on the cell tray 120 and the electrode leads 111 can be welded when the busbars 500 are arranged along a direction parallel to the protruding direction of the electrode leads 111 and 112. In such a case, the busbar 500 and the electrode leads 111 and 112 are welded in the same direction as the stacking direction of the battery cells 110. Since the welding is performed in a state where the adjacent busbar 500 and the electrode leads 111 and 112 are arranged in parallel with each other, it is possible to easily confirm whether the surface contact of the welding object is well performed without obstacles in the surrounding space.

Figure 13:
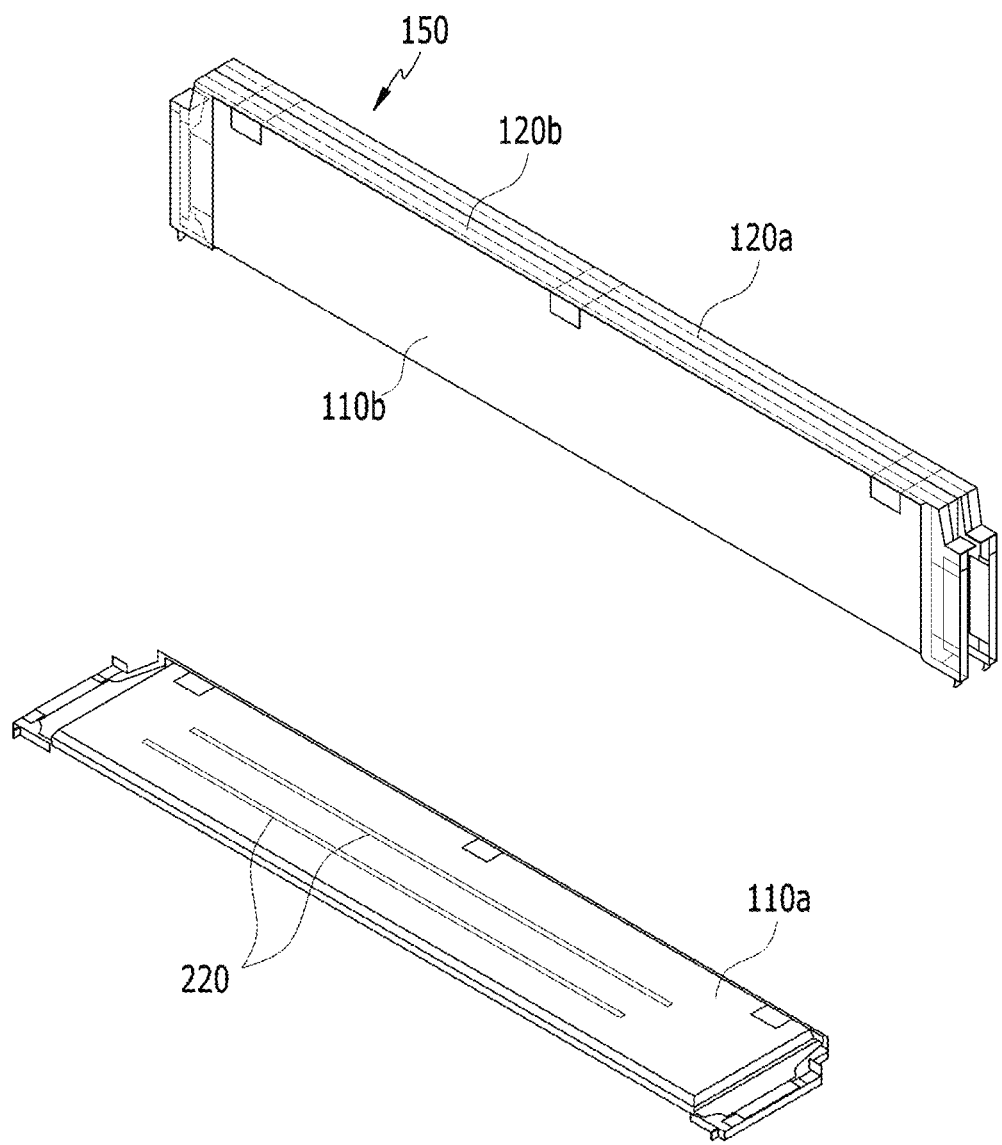

As illustrated in FIG. 13, when the battery cell 110 described in FIG. 12 is referred to as a first battery cell 110a, a second battery cell 110b adjacent to the first battery cell 110a may be connected to the first battery cell 110a by an adhesive member 220. The adhesive member 220 may have at least one pattern on the side surface of the first battery cell 110a. As an example, as illustrated in FIG. 13, it is possible to form the adhesive member 220 in which two patterns are applied to the side surface part of the first battery cell 110a in parallel to each other.

The first battery cell 110a is mounted on the first cell tray 120a, and the second battery cell 110b is mounted on the second cell tray 120b. As illustrated in FIGS. 6 and 7, one cell unit 150 including at least a first battery cell 110a and a second battery cell 110b can be formed.

Figure 14:
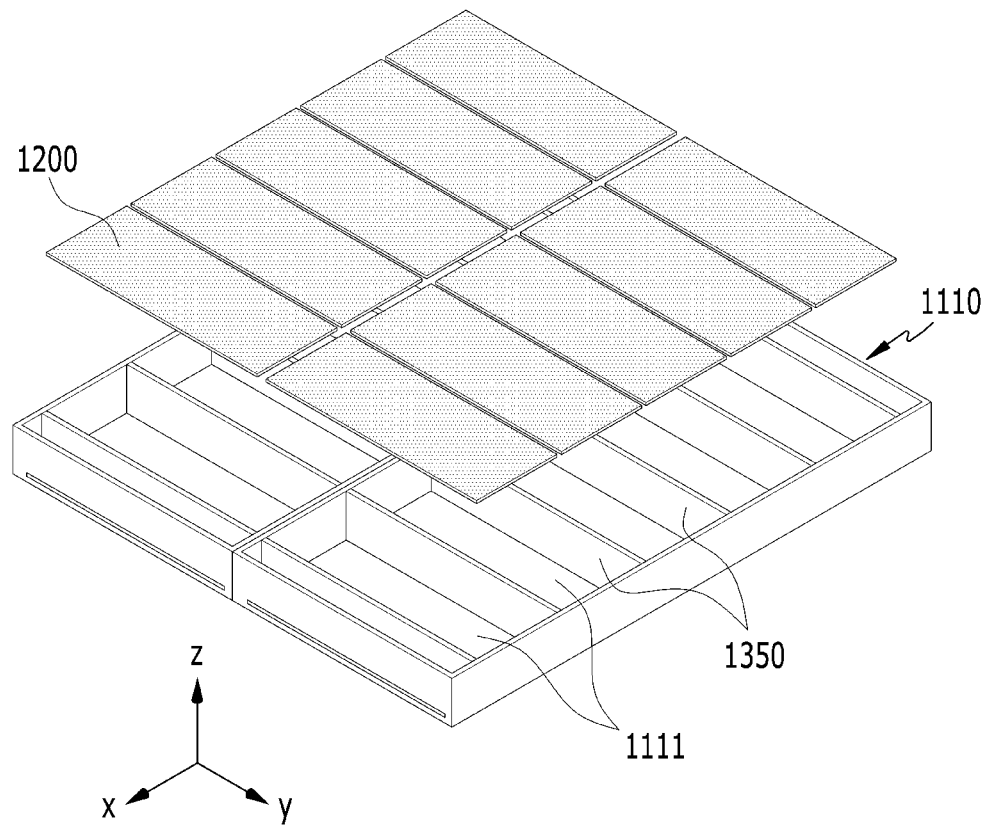

As illustrated in FIG. 14, a thermal conductive resin can be applied to the bottom part 1111 of the lower housing portion 1110 having a plurality of module regions to form a thermal conductive resin layer 1200. The plurality of module regions may be partitioned by a plurality of partition walls 1350 formed in the lower housing portion 1110.

Figure 15:
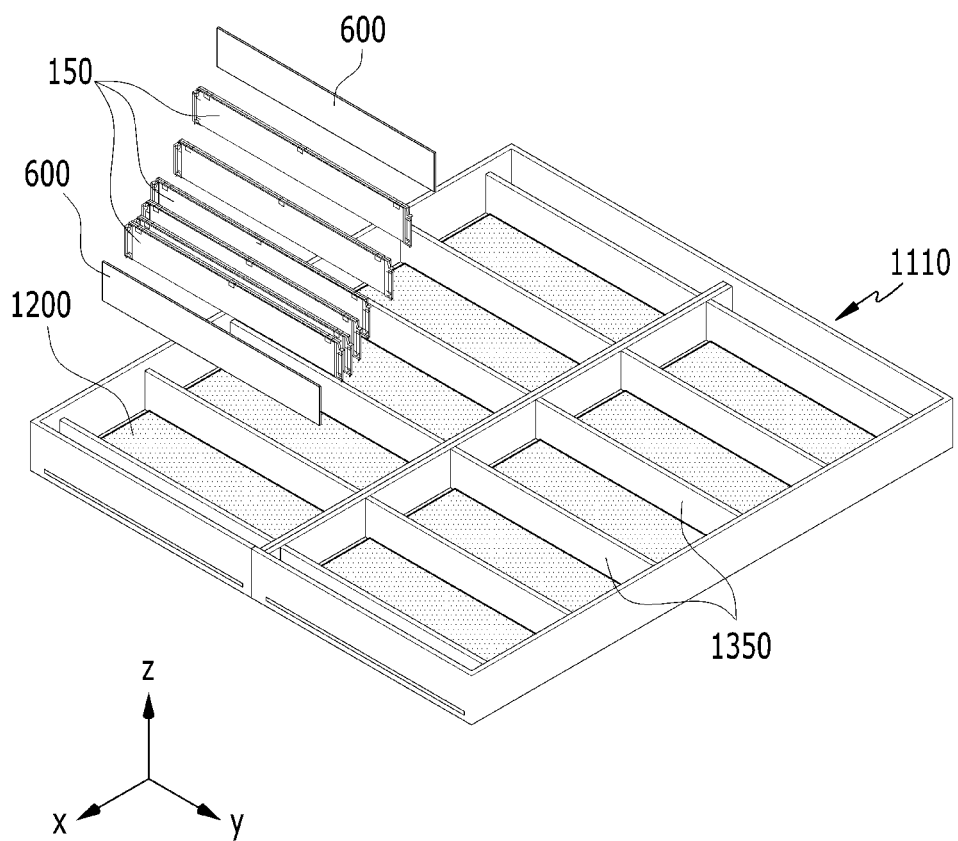

As illustrated in FIG. 15, the cell units 150 can be sequentially placed onto the thermal conductive resin layer 1200 to form the battery cell stack 200 shown in FIG. 8. Side surface plates 600 can be formed on both surfaces of the battery cell stack 200, respectively. At least one of the side surface plates 600 positioned on the battery cell stack 200 may be first formed in the lower housing portion 1110, and then the cell units 150 may be sequentially placed thereon.

Figure 16:
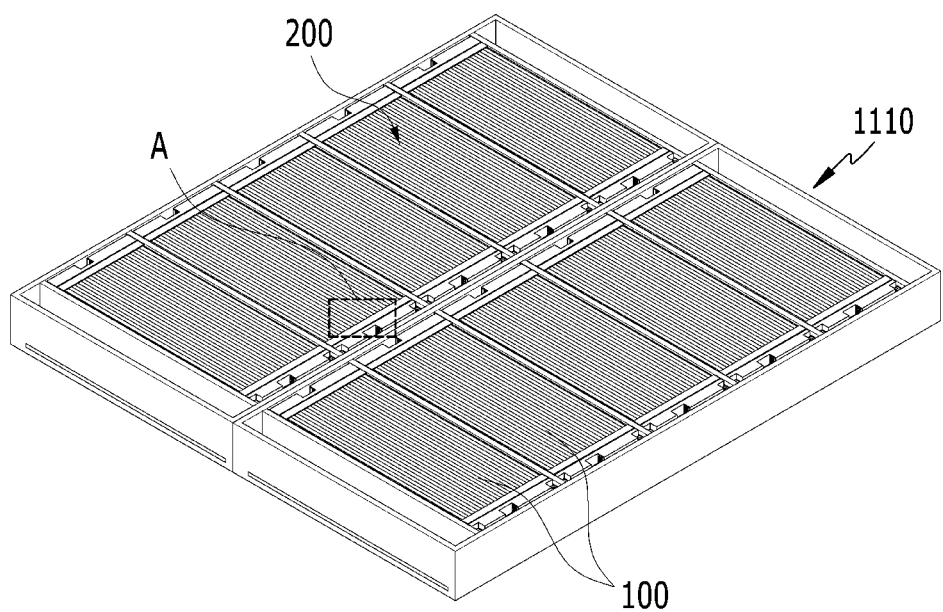
Figure 17:
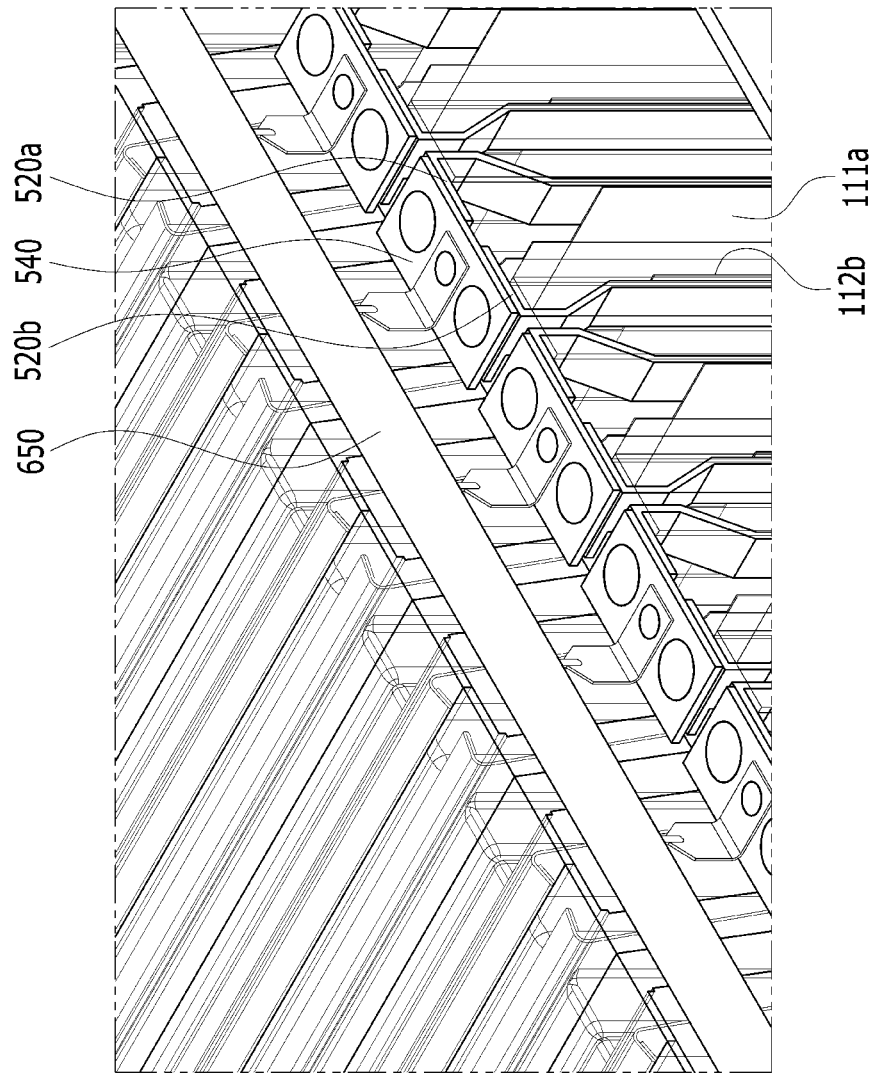

FIG. 16 is an illustration of a battery module 100 including the battery cell stack 200 when it is completely inserted into the lower housing portion 1110, and FIG. 17 is an enlarged view of region A of FIG. 16.

As illustrated in FIGS. 16 and 17, busbars mounted on each of the cell trays included in the battery cell stack can be connected. Specifically, the welding surfaces of the busbar connection parts 520a and 520b included in the busbar can be connected by a single cell unit connection member 650. A busbar connection member 540 can be formed between the cell unit connection member 650 and the busbar connection parts 520a and 520b. The busbar connection member 540 can connect the busbar connecting ports 520a and 520b formed in each of the adjacent battery cells with each other.

In another exemplary embodiment, the busbar connection member 540 is omitted, and the cell unit connection member 650 may be welded directly to the busbar connection parts 520a and 520b.

Figure 18:
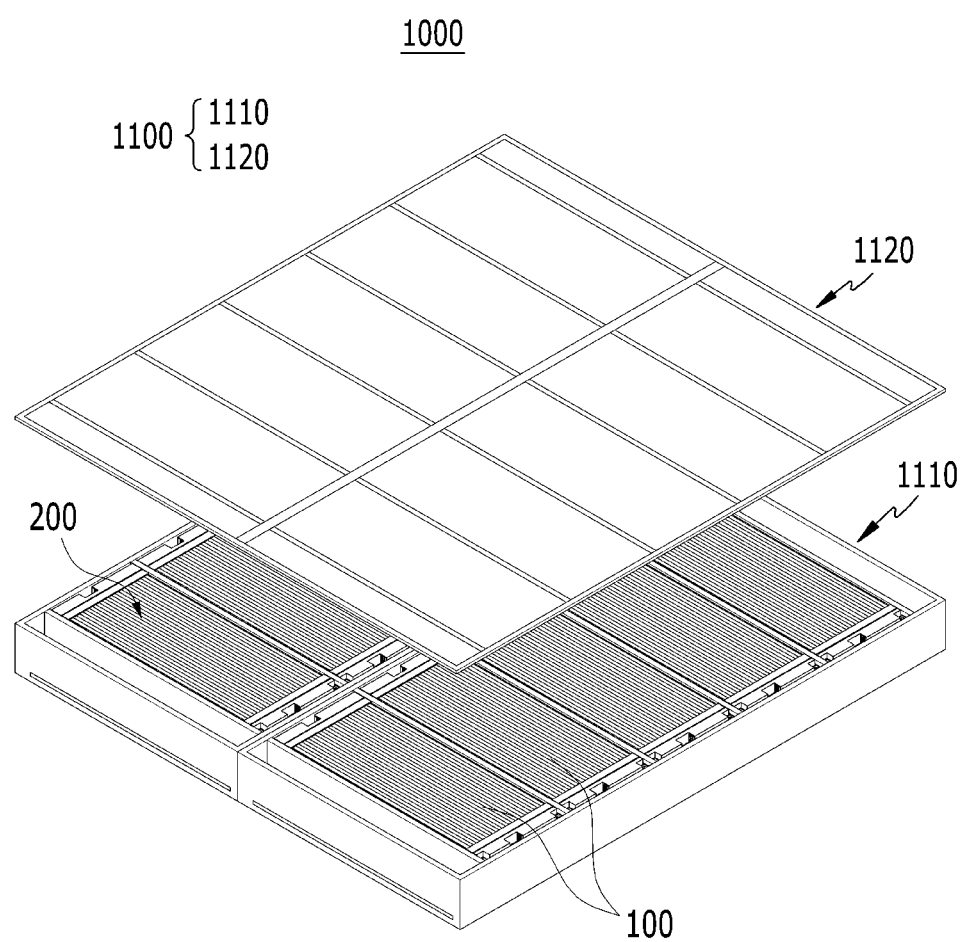

As illustrated in FIG. 18, the upper portion of housing 1120 can be formed on the lower housing portion 1110 to cover the battery module 100 including the battery cell stack. In one example, the manufactured battery pack 1000 according to an exemplary embodiment of the present disclosure may include a housing 1100 for the battery module 100 and a thermal conductive resin layer 1200 positioned between the battery module 100 and the bottom part 1111 of the lower housing portion 1100.

The battery module 100 includes an insulating cover as described above, and instead may form a module-less structure in which the housing and the end plate are removed. A plurality of such battery modules 100 can be housed in the lower housing portion 1100 to form the battery pack 1000.

The lower housing portion 1100 may include a lower housing portion 1110 and an upper housing portion 1120 that covers the lower housing portion 1110, and a plurality of battery modules 100 may be disposed on the bottom part 1111 of the lower housing portion 1110. The lower housing portion 1110 has a plurality of module regions, and the plurality of module regions may be partitioned by a plurality of partition walls 1350 formed in the lower housing portion 1110. The partition wall 1350 is formed between battery modules 100 adjacent to each other among the plurality of battery modules 100. For example, the thermal conductive resin layer 1200 includes a first thermal conductive resin layer and a second thermal conductive resin layer adjacent to each other, the plurality of module regions include a first region and a second region that are partitioned from each other by a partition wall 1350, the first thermal conductive resin layer is formed to correspond to the first region, and the second thermal conductive resin layer is formed to correspond to the second region. At this time, the first thermal conductive resin layer and the second thermal conductive resin layer may be separated from each other by the partition wall 1350.

The thermal conductive resin layer 1200 may be formed by applying a thermal conductive resin to the bottom part 1111 of the lower housing portion 1110. The thermal conductive resin may include a heat conductive adhesive material, and specifically, may include at least one of silicone material, urethane material, and acrylic material. The thermal conductive resin is a liquid during application but is cured after application so that it can fix the battery module 100 to the lower housing portion 1110. Further, heat generated from the battery cell 100 can be quickly transferred to the bottom part 1111 because the thermal conductive resin has excellent heat transfer properties, thereby preventing overheating of the battery pack 1000.

According to the present embodiment, since the housing is omitted in the battery module 100, the lower surface of the battery cell stack 200 of FIG. 2 can be mounted directly on the thermal conductive resin layer 1200 applied to the lower housing portion 1110. In addition, even when the battery cells 110 are mounted in the cell tray, the cell tray may have a structure that surrounds only the front and rear ends and upper corners of the battery cells 110, and therefore, the lower surface of the battery cell stack 200 may be mounted directly on the thermal conductive resin layer 1200. The battery cell stack 200 can be fixed to the lower housing portion 1110 by the thermal conductive resin layer 1200 having adhesive performance.

As illustrated in FIG. 2, in the battery module 100 according to the present embodiment, a part of the battery cells 110 can be exposed to the outside in the module-less structure in which the housing is removed, and it is essential to fix the exposed battery cells 110 for structural stability. Therefore, the battery pack 1000 according to the present embodiment can include a thermal conductive resin layer capable of fixing the battery module 100, particularly, each battery cell 110 constituting the battery module 100, to the bottom part 1111, thereby improving structural stability. Further, by eliminating the housing, the heat generated from the battery cells can be directly transferred from the thermal conductive resin layer to the lower housing portion, thereby improving the cooling efficiency. Although not shown, a heat sink structure may be formed on the housing.

The battery module or the battery pack according to embodiments of the present disclosure as described above can be applied to various devices. Specifically, such a device may be applied to a vehicle means such as an electric bicycle, an electric vehicle, or a hybrid vehicle, but the present disclosure is not limited thereto, and is applicable to various devices that can use a battery module.

Although the invention has been shown and described above with reference to the preferred embodiments, the scope of the present disclosure is not limited thereto, and numerous other modifications and improvements made by those skilled in the art by using the basic principles of the invention described in the appended claims falls within the spirit and scope of the present disclosure.

The invention claimed is:

1. A battery module comprising:
    a plurality of battery cells each having an electrode lead protruding therefrom,
    wherein each of the battery cells is on a respective cell tray of a plurality of cell trays,
    a plurality of busbars, wherein each of the busbars is on the respective cell tray, wherein each of the busbars is in a direction parallel to a protruding direction of the electrode lead,
    wherein a portion of each of the busbars is welded to the respective electrode lead,
    wherein each of the busbars comprises a busbar plate, which is the portion of each of the busbars welded to the respective electrode lead, wherein one end of the busbar plate bends in a direction perpendicular to a surface of the busbar plate to define a busbar connection part, and
    a busbar connection member welded to the busbar connection part on a welding surface,
    wherein the welding surface faces a width direction of each of the battery cells, which is a direction perpendicular to a stacking direction of the battery cells and perpendicular to the protruding direction of the respective electrode lead.

2. The battery module according to claim 1, wherein:
    the electrode lead is welded to the respective busbar plate in the stacking direction of the battery cells.

3. The battery module according to claim 1, wherein:
    the battery cells comprise a first battery cell and a second battery cell that are adjacent to each other, the cell trays comprise a first cell tray and a second cell tray, wherein the first battery cell and the second battery cell are on the first cell tray and the second cell tray, respectively, the first battery cell on the first cell tray and the second battery cell on the second cell tray are a cell unit, a plurality of cell units are a battery cell stack, and the cell units are connected by a single cell unit connection member.

4. The battery module according to claim 3, wherein:

the cell unit connection member connects a welding part of the busbar connection part of each of the plurality of cell units.

5. The battery module according to claim 4, wherein the busbar connection part comprises a first busbar connection part and a second busbar connection part;

wherein the busbar connection member connects the first busbar connection part on the first cell tray and the second busbar connection part on the second cell tray.

6. The battery module according to claim 5, wherein:

the busbar connection member is between the cell unit connection member and the first and second busbar connection parts.

7. The battery module according to claim 3, further comprising an adhesive member connecting adjacent cell units.

8. The battery module according to claim 3, further comprising a fixing member at an end part of each of the first cell tray and the second cell tray in a width direction.

9. A battery pack comprising:

the battery module as set forth in claim 1, a housing for the battery module, and a thermal conductive resin layer between the battery module and a bottom part of the housing.

10. A method of manufacturing a battery pack, the method comprising:

mounting each of a plurality of battery cells on a respective cell tray, welding an electrode lead protruding from each of the plurality of battery cells to a respective busbar on the respective cell tray, forming a busbar connection part by bending an end part of a busbar plate of the respective busbar that is welded to the respective electrode lead, connecting adjacent battery cells with an adhesive member to form a cell unit including at least two battery cells, applying a thermal conductive resin to a lower housing portion having a plurality of module regions to form a thermal conductive resin layer, sequentially disposing a plurality of cell units on the thermal conductive resin layer to form a battery cell stack, and connecting the busbars mounted on each of the plurality of cell trays of the battery cell stack to one another by welding a busbar connection member to the busbar connection part on a welding surface, wherein the welding surface is formed to face a width direction of each of the plurality of battery cells, which is a direction perpendicular to a stacking direction of the plurality of battery cells and perpendicular to a protruding direction of the respective electrode lead.

11. The method of manufacturing a battery pack according to claim 10, wherein:

the respective electrode lead and the respective busbar are welded in a same direction as the stacking direction of the plurality of battery cells when the busbars are arranged along a direction parallel to the protruding direction of the respective electrode lead.

12. The method of manufacturing a battery pack according to claim 11, wherein: the welding surface is connected by a single cell unit connection member.

13. The method of manufacturing a battery pack according to claim 12, wherein the busbar connection member connects the busbar connection parts of adjacent battery cells, wherein the busbar connection member is formed between the cell unit connection member and the busbar connection part.

14. The method of manufacturing a battery pack according to claim 10, further comprising forming an upper housing portion to cover the battery cell stack.

* * * * *